US009448763B1

(12) United States Patent
Dziuk et al.

(10) Patent No.: US 9,448,763 B1
(45) Date of Patent: Sep. 20, 2016

(54) ACCESSIBILITY MANAGEMENT SYSTEM FOR MEDIA CONTENT ITEMS

(71) Applicant: Spotify AB, Stockholm (SE)

(72) Inventors: Dariusz Dziuk, Stockholm (SE); Rahul Sen, Stockholm (SE); Matilda Hannäs, Stockholm (SE); Nikolaos Toumpelis, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 14/883,323

(22) Filed: Oct. 14, 2015

Related U.S. Application Data

(60) Provisional application No. 62/163,876, filed on May 19, 2015.

(51) Int. Cl.
*G06F 17/30* (2006.01)
*G06F 3/16* (2006.01)
*G06F 3/01* (2006.01)

(52) U.S. Cl.
CPC ............... *G06F 3/165* (2013.01); *G06F 3/011* (2013.01)

(58) Field of Classification Search
CPC ..................... G06F 3/04842; G06F 17/30017; G06F 17/30058; G06F 17/30867
See application file for complete search history.

(56) References Cited

U.S. PATENT DOCUMENTS 6,098,126 A * 8/2000 Batson .............. G06F 17/30017 707/E17.028
7,683,252 B2 * 3/2010 Oliver ................ A61B 5/02438 84/612
2006/0107822 A1 5/2006 Bowen
2007/0074617 A1 4/2007 Vergo
2007/0106723 A1 * 5/2007 Nakamura ......... H04N 7/17318 709/203
2008/0096726 A1 * 4/2008 Riley ................. A63B 24/0006 482/8
2011/0093100 A1 4/2011 Ramsay
2014/0338516 A1 11/2014 Andri
2015/0181314 A1 * 6/2015 Swanson .................. H04Q 9/00 340/870.07

OTHER PUBLICATIONS

U.S. Appl. No. 14/883,336, filed Oct. 14, 2015 for "Selection and Playback of Song Versions Using Cadence".
U.S. Appl. No. 14/883,252, filed Oct. 14, 2015 for "Repetitive Motion Activity Enhancement Based Upon Media Content Selection".
U.S. Appl. No. 14/883,245, filed Oct. 14, 2015 for "Heart Rate Control Based Upon Media Content Selection".
U.S. Appl. No. 14/883,232, filed Oct. 14, 2015 for "Cadence Determination and Media content Selection".
U.S. Appl. No. 14/883,298, filed Oct. 14, 2015 for "Cadence-Based Playlists Management System".
U.S. Appl. No. 14/883,273, filed Oct. 14, 2015 for "Multi-Track Playback of Media content During Repetitive Motion Activities".
U.S. Appl. No. 14/883,295, filed Oct. 14, 2015 for "Search Media Content Based Upon Tempo".

(Continued)

*Primary Examiner* — Yuk Ting Choi
(74) *Attorney, Agent, or Firm* — Merchant & Gould P.C.

(57) ABSTRACT

A system operates to manage accessibility of media content items based on a user's performance of a repetitive motion activity. The system can generate rule data based on a rule designed to permit access to certain media content items. The rule data can include information about various conditions to be satisfied to make the media content items accessible for playback. Such conditions can be associated with a user's performance or status of a repetitive motion activity.

20 Claims, 11 Drawing Sheets

(56) References Cited

OTHER PUBLICATIONS

U.S. Appl. No. 14/883,318, filed Oct. 14, 2015 for "Cadence and Media Content Phase Alignment".
U.S. Appl. No. 14/944,972, filed Nov. 18, 2015 for "System for Managing Transitions Between Media Content Items".
U.S. Appl. No. 14/945,008, filed Nov. 18, 2015 for "Identifying Media Content".
U.S. Appl. No. 14/883,340, filed Oct. 14, 2015 for "Cadence-Based Selection, Playback, and Transition Between Song Versions".
International Search Report and Written Opinion from corresponding International Patent Application No. PCT/ EP2016/061044, mailed Aug. 3, 2016.
U.S. Appl. No. 14/883,336, filed on Oct. 14, 2015 for "Selection and Playback of Song Versions Using Cadence".
U.S. Appl. No. 14/883,252, filed on Oct. 14, 2015 for "Repetitive Motion Activity Enhancement Based Upon Media Content Selection".
U.S. Appl. No. 14/883,245, filed on Oct. 14, 2015 for "Heart Rate Control Based Upon Media Content Selection".
U.S. Appl. No. 14/883,232, filed on Oct. 14, 2015 for "Cadence Determination and Media content Selection".
U.S. Appl. No. 14/883,298, filed on Oct. 14, 2015 for "Cadence-Based Playlists Management System".
U.S. Appl. No. 14/883,273, filed on Oct. 14, 2015 for "Multi-Track Playback of Media content During Repetitive Motion Activities".
U.S. Appl. No. 14/883,295, filed on Oct. 14, 2015 for "Search Media Content Based Upon Tempo".
U.S. Appl. No. 14/883,318, filed on Oct. 14, 2015 for "Cadence and Media Content Phase Alignment".
U.S. Appl. No. 14/944,972, filed on Nov. 18, 2015 for "System for Managing Transitions Between Media Content Items".
U.S. Appl. No. 14/945,008, filed on Nov. 18, 2015 for "Identifying Media Content".
U.S. Appl. No. 14/883,340, filed on Oct. 14, 2015 for "Cadence-Based Selection, Playback, and Transition Between Song Versions".

* cited by examiner

244

352 354 356A 356B 356C 356D 356E 356F 356G

| MEDIA CONTENT ITEM ID | RULES | | | | | | | |
|---|---|---|---|---|---|---|---|---|
| | CADENCE | SPEED | DISTANCE | DURATION | HEART RATE | LOCATION | OVERPERFORM | • • • |
| 5 | | | | > 60 MINS | | | | • • • |
| 16 | | | > 10 MILES | | | | | • • • |
| 22 | > 130 | > 5 MPH | | > 100 MINS | | REGION 89 | | • • • |
| 34 | > 170 | | | | > 155 | | | • • • |
| 52 | | | | | > 155 | | > 10% | • • • |
| • • • | • • • | • • • | • • • | • • • | • • • | • • • | • • • | • • • |

*FIGURE 5*

ACCESSIBILITY MANAGEMENT SYSTEM FOR MEDIA CONTENT ITEMS

CROSS-REFERENCE TO RELATED APPLICATION

This application claims priority to U.S. Ser. No. 62/163,876 filed on May 19, 2015 and entitled ACCESSIBILITY MANAGEMENT SYSTEM FOR MEDIA CONTENT ITEMS, the disclosure of which is hereby incorporated by reference in its entirety.

BACKGROUND

Running, as well as many other recreation or fitness activities, includes repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity. It may also be difficult to effectively use media content items to encourage users to continue to run or engage in other repetitive-motion activities.

SUMMARY

In general terms, this disclosure is directed to an accessibility management system for media content items. In one possible configuration and by non-limiting example, the system manages accessibility of media content items based on a user's performance of a repetitive motion activity. Various aspects are described in this disclosure, which include, but are not limited to, the following aspects.

One aspect is a method of managing accessibility of media content items based on a user's performance of a repetitive motion activity. The method may include acquiring, using at least one computing device, a user's performance of a repetitive motion activity; obtaining, using the at least one computing device, rule data, the rule data containing a condition for permitting a media content item to be accessible for playback; determining, using the at least one computing device, that the user's performance satisfies the condition for the media content item; and permitting, using the at least one computing device, access to the media content item for playback.

Another aspect is a computer-readable storage medium comprising software instructions that, when executed, cause at least one computing device to: acquire a user's performance of a repetitive motion activity; obtain rule data, the rule data containing a condition for permitting a media content item to be accessible for playback; determine that the user's performance satisfies the condition for the media content item; and permit access to the media content item for playback.

BRIEF DESCRIPTION OF THE DRAWINGS

FIG. 5 illustrates example rule data containing information about a rule.

DETAILED DESCRIPTION

Figure 1:
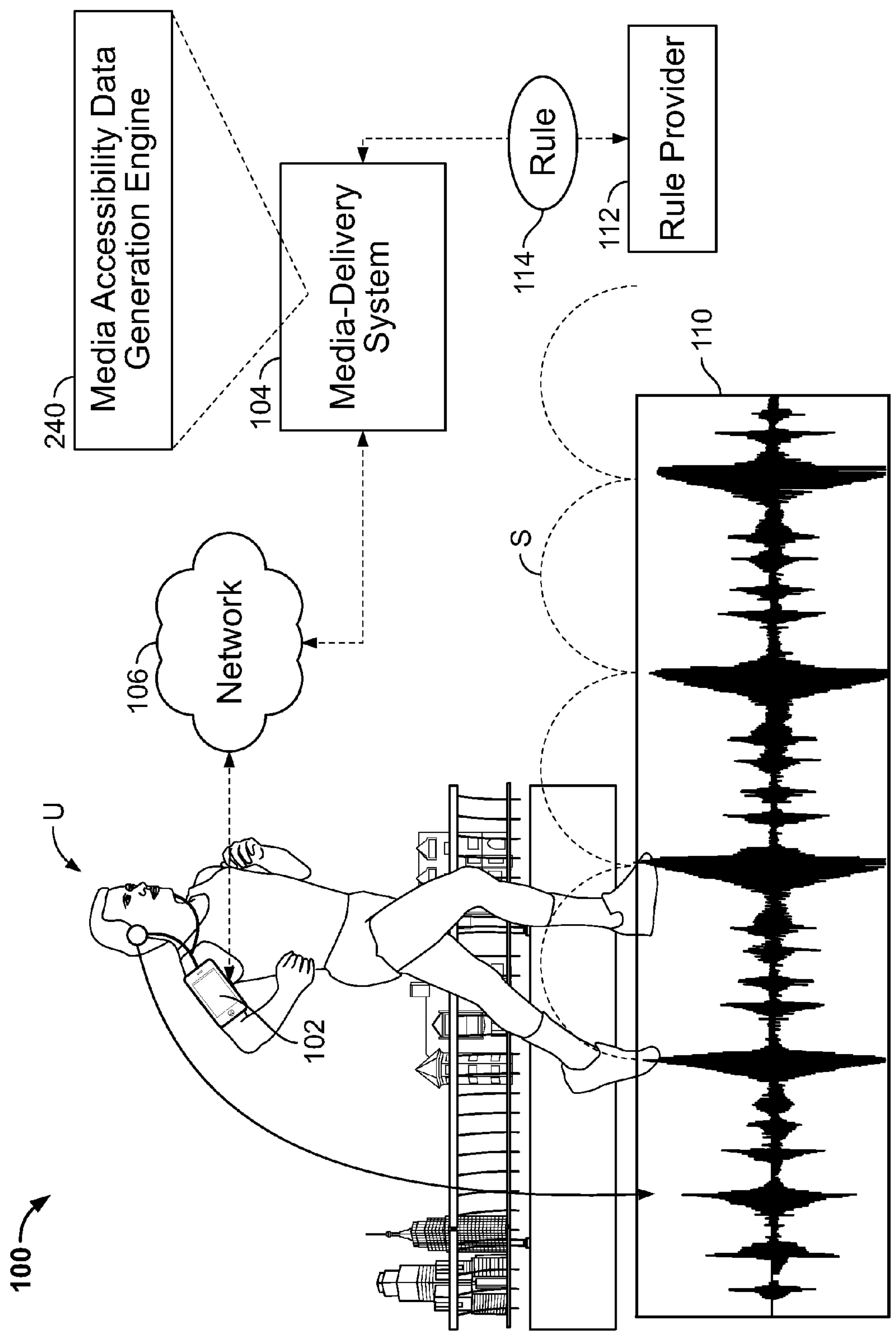
FIG. 1 illustrates an example system for managing accessibility of media content items based on a user's performance of a repetitive motion activity.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

In general, the present disclosure is directed to a system for managing accessibility of media content items based on a user's performance of a repetitive motion activity. The system operates to generate rule data based on a rule designed to permit access to certain media content items. The rule data include information about various conditions to be satisfied to make the media content items accessible for playback. Such conditions can be associated with a user's performance or status of a repetitive motion activity. The rule can be provided by a rule provider for various purposes, such as for promotion of the media content items or any other products or services. A media-playback device is provided to acquire a user's cadence and play back a plurality of media content items having a tempo corresponding to the cadence while the user performs a repetitive motion activity. The media-playback device can further acquire a user's performance of the repetitive motion activity. The system operates to determine whether the user's performance satisfies the condition of a media content item, and make the media content item accessible for playback if the condition is met.

As such, the system according to the present disclosure can use certain media content items to encourage users to continue to engage in a repetitive motion activity. For example, the system can provide media content items that have unique characteristics (e.g., newly released items or rare items), but make them accessible only when a user satisfies a certain condition relating to the repetitive motion activity. The users who want to play back such media content items are encouraged to achieve the condition, thereby outperforming what they would otherwise likely do in the activity. In this regard, the system can make the repetitive motion activity more enjoyable and effective to users.

FIG. 1 illustrates an example system 100 for managing accessibility of media content items based on a user's performance of a repetitive motion activity. The example system 100 includes a media-playback device 102 and a media-delivery system 104. In some embodiments, a media accessibility management engine 240 runs on the media-delivery system 104. The system 100 further includes a rule provider 112 that can provide a rule 114. The system 100 communicates across a network 106. Also shown are a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a media content item having a tempo that is equal or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media-playback device 102 operates to play music having a tempo that is within a predetermined range of a target tempo. In at least some embodiments, the predetermined range is plus or minus 2.5 BPM. For example, if the user U is running at a cadence of 180 steps per minute, the media-playback device 102 operates to play music having a tempo of 177.5-182.5 BPM. Alternatively, in other embodiments, the predetermined range is itself in a range from 1 BPM to 10 BPM. Other ranges of a target tempo are also possible.

Further, in some embodiments, the media content items that are played back on the media-playback device 102 have a tempo equal to or approximately equal to a user U's cadence after it is rounded. For example, the cadence may be rounded to the nearest multiple of 2.5, 5, or 10 and then the media playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

The rule provider 112 is an entity that provides the rule 114 to the media-delivery system 104. The rule provider 112 can be one or more individuals, groups, companies, organization, businesses, or other entities of any types. In some embodiments, an entity that manages the media-delivery system 104 is the rule provider 112. In other embodiments, a third party entity is the rule provider 112 for various purposes. For example, a third party entity can provide a rule designed to selectively allow access to one or more media content items for promotional purposes. By way of example, when an athletic shoe company sponsors a particular song, the company can set up a rule to make the song accessible by a user only when the user achieves an associated condition specified in the rule.

The rule 114 is configured to include one or more conditions associated with one or more media content items, which a user must satisfy to make the associated media content items accessible for playback. An example data including the rule 114 is illustrated and described in more detail with reference to FIG. 5.

The media accessibility management engine 240 operates to manage the rule 114, and implement the rule 114 with the media-playback device 102. An example operation of the media accessibility management engine 240 is described and illustrated in more detail with reference to FIGS. 4-9.

Figure 2:
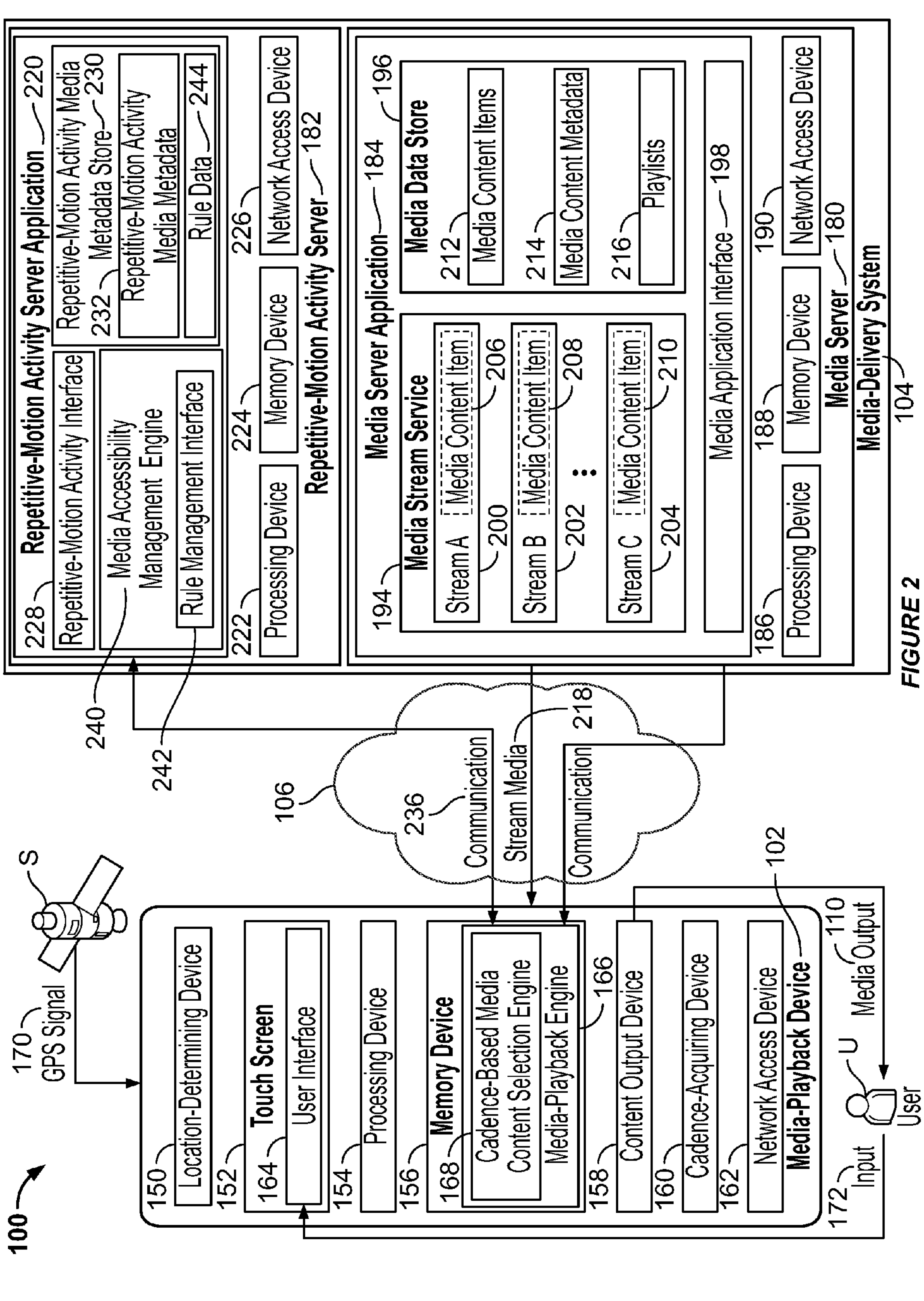
FIG. 2 is a schematic illustration of an example system for managing accessibility of media content items based on a user's performance of a repetitive motion activity.

FIG. 2 is a schematic illustration of an example system 100 for managing accessibility of media content items based on a user's performance of a repetitive motion activity. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a cadence-based media content selection engine 168.

The memory device 156 typically includes at least some form of computer-readable media. Computer readable media include any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media-playback engine 166 operates to play back one or more of the media content items (e.g., music) to encourage the running of the user U. As described herein, the media-playback engine 166 is configured to communicate with the media-delivery system 104 to receive one or more media content items (e.g., through the stream media 218) based on the cadence detected by the cadence-acquiring device 160.

The cadence-based media content selection engine 168 operates to retrieve one or more media content items based on a cadence of the user U acquired by the media-playback device 102 (e.g., the cadence-acquiring device 160 thereof). In some embodiments, the cadence-based media content selection engine 168 is configured to send a request to the media-delivery system 104 for media content items having a tempo corresponding to the acquired cadence, and receive information (e.g., the repetitive-motion activity media metadata 232) about such media content items for playback during the user's performance of repetitive motion activity.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228, a repetitive-motion activity media metadata store 230, and the media accessibility management engine 240.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

In some embodiments, the repetitive-motion activity media metadata store 230 stores repetitive-motion activity media metadata 232 and rule data 244. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that corresponds to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

The rule data 244 operates to provide information about the rule 114 provided by the rule provider 112. An example of the rule data 244 is described and illustrated with reference to FIG. 5. In some embodiments, the rule data 244 are provided separately from the repetitive-motion activity media metadata 232. In other embodiments, the rule data 244 are incorporated in the repetitive-motion activity media metadata 232. Although it is illustrated that the rule data 244 is stored in the repetitive-motion activity media metadata store 230, the rule data 244 is stored in other stores, such as the media data store 196. For example, the rule data 244 can be stored in the media data store 196, either separately from the media content metadata 214 or being incorporated in the media content metadata 214.

The media accessibility management engine 240 is configured to generate the rule data 244 based on the rule 114 provided by the rule provider 112. In some embodiments, the media accessibility management engine 240 includes a rule management interface 242 configured to provide an interface for the rule provider 112 to interact with to provide the rule 114 to the media-delivery system 104. An example rule management interface 242 is illustrated and described in more detail with reference to FIG. 6.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for managing accessibility of media content items based on a user's performance of a repetitive motion activity, other embodiments are possible as well. For example, in some embodiments, the media-playback device 102 includes a media data store 196 and the media-playback device 102 is configured to perform managing accessibility of media content items without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive motion activity on the media-playback device 102.

Figure 3:
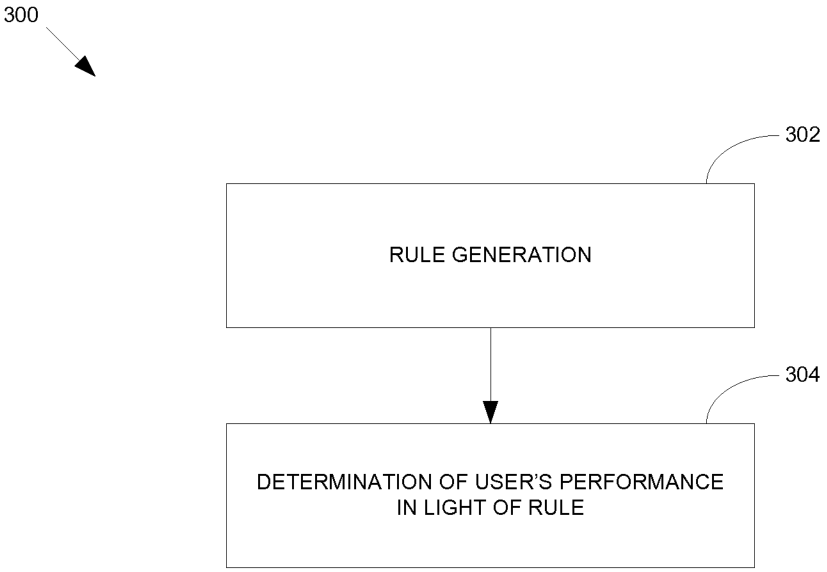
FIG. 3 is a flowchart illustrating an example method for managing accessibility of media content items based on a user's performance of a repetitive motion activity.

FIG. 3 is a flowchart illustrating an example method 300 for managing accessibility of media content items 212 based on a user's performance of a repetitive motion activity. In some embodiments, the method 300 includes a rule generation operation 302 and an operation 304 for determining a user's performance in light of the rule 114 (or the rule data 244).

At the operation 302, the media-delivery system 104 (e.g., the media accessibility management engine 240) operates to generate the rule data 244 based on the rule 114 provided by the rule provider 112. In other embodiments, the operation 302 is performed by one or more other computing devices. An example of the operation 302 is described and illustrated in more detail with reference to FIG. 4.

At the operation 304, the media-delivery system 104 operates to determine whether a user's performance of a repetitive motion activity satisfies one or more conditions defined in the rule data 244 for making one or more associated media content items accessible for playback. As described herein, in other embodiments, the media-playback device 102 operates to perform the determination, instead of the media-delivery system 104. In yet other embodiments, one or more other computing devices are used to perform the operation 304. An example of the operation 304 is described and illustrated in more detail with reference to FIG. 7.

Figure 4:
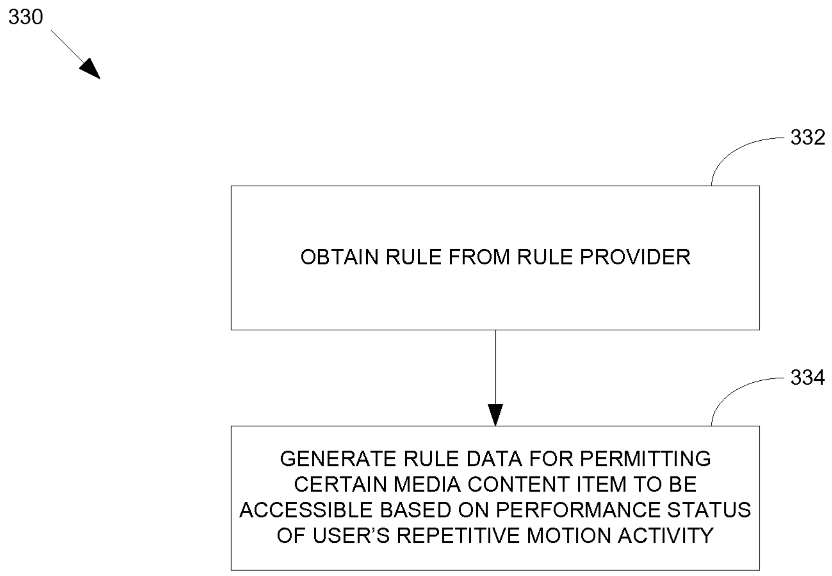
FIG. 4 is a flowchart illustrating an example method of performing an operation of FIG. 3.

FIG. 4 is a flowchart illustrating an example method 330 of performing the operation 302 of FIG. 3. In some embodiments, the method 330 includes operations 332 and 334.

At the operation 332, the media-delivery system 104 (e.g., the media accessibility management engine 240) operates to obtain the rule 114 from the rule provider 112. As described above, the media accessibility management engine 240 can provide a rule management interface 242 through which the rule provider 112 inputs the rule 114 to the media-delivery system 104. In other embodiments, the rule provider 112 provides the rule 114 to the media-delivery system 104 in different manners.

At the operation 334, the media-delivery system 104 (e.g., the media accessibility management engine 240) operates to generate the rule data 244 that contain the rule 114. The rule data 244 are configured and used to permit certain media content items to be accessible for playback based on the performance status or result of a user's repetitive motion activity.

FIG. 5 illustrates example rule data 244 containing information about the rule 114. In some embodiments, the rule data 244 (or the rule 114) include a media content item ID column 352 and a condition column 354.

The media content item ID column 352 includes one or more media content item IDs used to identify media content items associated with conditions that must be satisfied to make the media content items accessible for playback.

The condition column 354 includes information about the conditions. In some embodiments, the condition column 354 include one or more criteria columns 356 (including 356A-356G). The criteria columns 356 show one or more criteria of the conditions. A media content item that is to be accessible can be associated with a condition including one or more criteria. By way of example, as illustrated in FIG. 5, a media content item 212 that is identified as media content item ID 5 is associated with a condition having duration as a criterion and 60 minutes as a threshold. In particular, a user must perform a repetitive motion activity long than 60 minutes to make the media content item 212 having ID 5 accessible for playback.

In the illustrated example, the criteria of the conditions include cadence, speed, distance, heart rate, location, over performance, and other suitable criteria. A condition for a media content item can be set up with one of these criteria or any combination of them. In some examples, a media content item can be changed to be accessible for playback when a user performs a repetitive motion activity with a particular cadence for a particular duration. In other examples, a media content item becomes accessible for playback when a user is present at a particular location. In yet other examples, a media content item becomes accessible for playback when a user performs a repetitive motion activity over a particular goal. By way of example, where a goal for a user is set up to run 5 miles today, the user can make a particular media content item accessible for playback when the user runs 10% more (i.e., more than 5.5 miles).

Figure 6:
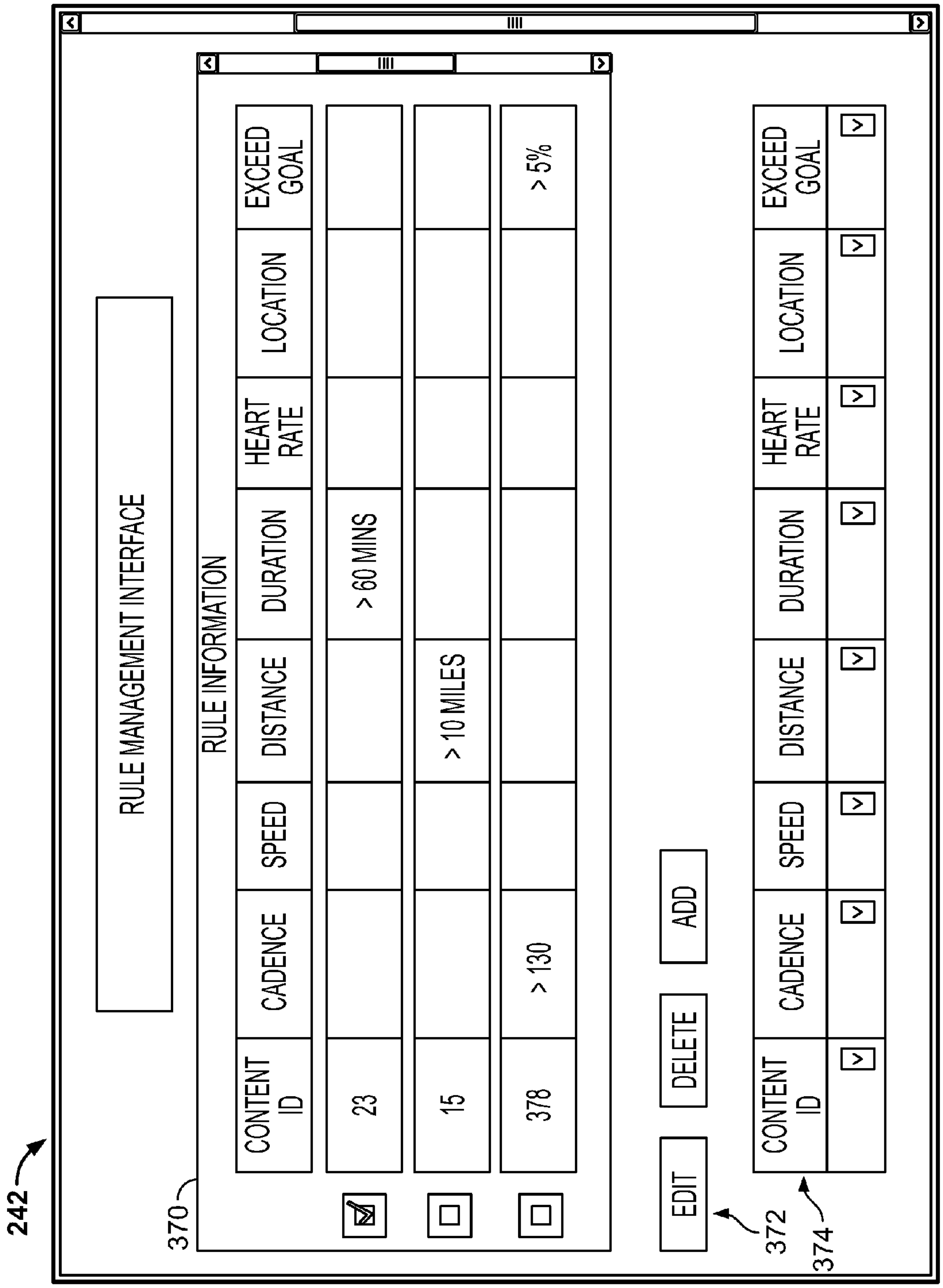
FIG. 6 illustrates an example rule management interface.

FIG. 6 illustrates an example of the rule management interface 242. In some embodiments, the rule management interface 242 includes defined rule information window 370, one or more management controls 372, and a rule selection window 374.

In some embodiments, the rule management interface 242 is implemented as a web-based user interface, which generates one or more webpages that are transmitted to and viewed by the rule provider 112 using a web browser program. For example, the media-delivery system 104 (e.g., the media accessibility management engine 240) operates as a web domain to serve a website to the rule provider 112.

The rule information window 370 displays information about the rule 114 (or the rule data 244) for one or more media content items 212.

The management controls 372 can be used to manage the rule data 244. In some embodiments, the management controls 372 include edit, delete, and add buttons. The edit button is used to allow edit information of conditions, such as the media content item IDs and thresholds of one or more criteria. The delete button is used to delete one or more entries. The add button is used to add a new condition for a media content item. Although the management controls 372 are depicted as buttons in the illustrated example, other types of controls can also be possible.

The rule selection window 374 displays controls to set up or edit a condition for a media content item. The rule selection window 374 is configured to enable the rule provider 112 to set a threshold for at least one criterion for a particular media content item. In the illustrated example, each field of the rule selection window 374 is implemented with a drop-down list. In other embodiments, other types of controls are also possible, such as a text box.

Figure 7:
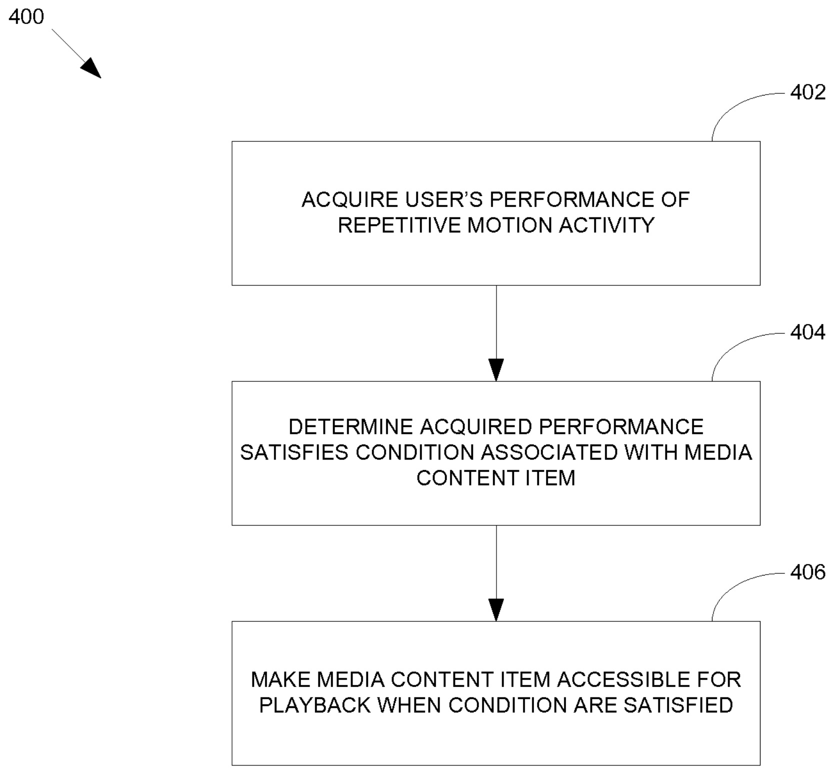
FIG. 7 is a flowchart generally illustrating an example method of performing an operation of FIG. 3.

FIG. 7 is a flowchart illustrating an example method 400 of performing the operation 304 of FIG. 3 in general. In some embodiments, the method 400 includes operations 402, 404, and 406.

At the operation 402, the media-delivery system 104 operates to acquire a user's performance of a repetitive motion activity. In some embodiments, the media-playback device 102 operates to detect a performance status of a user's repetitive motion activity. By way of example, the media-playback device 102 (including the cadence-acquiring device 160) automatically detects the user's cadence while the user is running. The media-playback device 102 can be further configured to detect other types of the user's performance, such as running speed, distance, and duration, the user's heart rate, and the user's current location (using the location-determining device 150). Once the media-playback device 102 detects such performance, the media-playback device 102 can transmit it to the media-delivery system 104 for further processes. In other embodiments, the user's performance of a repetitive motion activity can be detected by one or more other computing devices and then transmitted to the media-delivery system 104. In yet other embodiments, the user's performance can be obtained directly by the media-delivery system 104.

At the operation 404, the media-delivery system 104 and/or the media-playback device 102 operates to determine whether the acquired user performance satisfies a condition associated with one or more media content items. In some embodiments, the rule data 244 is looked up to search for any media content items having a condition that is satisfied by the acquired user performance result.

At the operation 406, the media-delivery system 104 and/or the media-playback device 102 operates to make one or more media content items accessible for playback if it is determined that the conditions of the media content items are satisfied.

Figure 8:
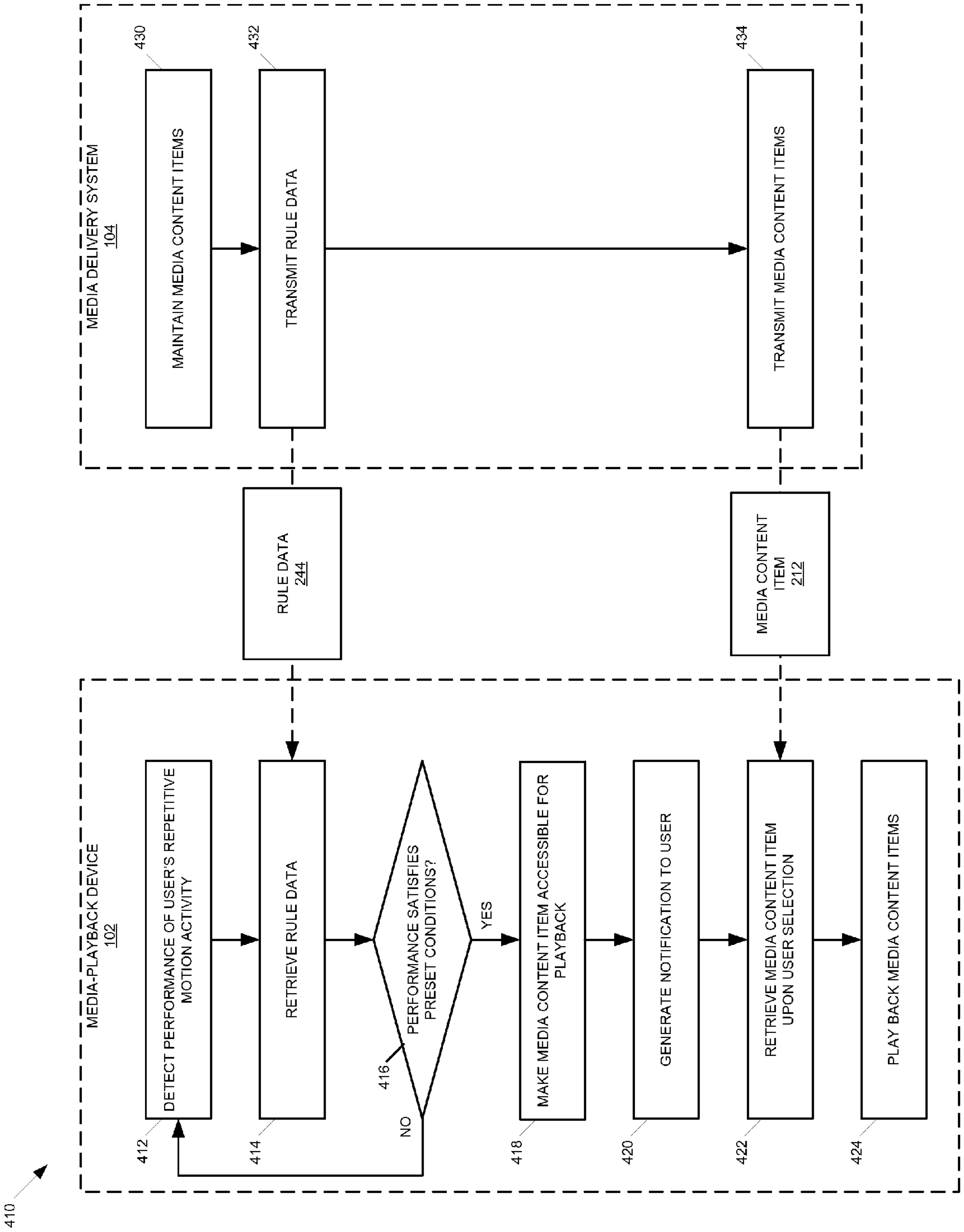
FIG. 8 illustrates a flowchart illustrating an example method of performing an operation of FIG. 3 with a media-playback device and a media-delivery system.

FIG. 8 illustrates a flowchart illustrating an example method 410 of performing the operation 304 of FIG. 3 with the media-playback device 102 and the media-delivery system 104. On the side of the media-playback device 102, the method 410 can include operations 412, 414, 416, 418, 420, 422, and 424. On the side of the media-delivery system 104, the method 410 can include operations 430, 432, and 434.

At the operation 412, the media-playback device 102 operates to detect a performance status of a user's repetitive motion activity. In some embodiments, the media-playback device 102 can automatically detect the performance status in real time while the user is performing the repetitive motion activity.

At the operation 414, the media-playback device 102 operates to retrieve the rule data 244 from the media-delivery system 104.

At the operation 416, the media-playback device 102 operates to determine whether the user's performance satisfies a condition for allowing a media content item to be accessible for playback. If so ("YES" at the operation 416), the method 410 moves on to the operation 418. Otherwise ("NO" at the operation 416), the method 410 returns to the operation 412.

At the operation 418, the media-playback device 102 operates to make the associated media content item accessible for playback. In some embodiments, the media-playback device 102 updates a user profile to allow the user access to the media content item.

In other embodiments, when it is determined that a condition associated with a media content item is satisfied, the media-delivery system 104 operates to make the associated media content item retrievable by the media-playback device 102. For example, the media-delivery system 104 can operate to update the media content metadata 214, the repetitive-motion activity media metadata 232, and/or the rule data 244 with such determination, thereby making the media content item retrievable by the media-playback device 102. In yet other embodiments, the media-delivery system 104 manages and updates user profile data with the determination so that the media-playback device 102 is permitted to retrieve the media content items associated with the satisfied condition.

At the operation 420, the media-playback device 102 operates to generate a notification to the user to inform that the condition has been met and the media content item associated with the condition is permitted to be played.

At the operation 422, the media-playback device 102 operates to retrieve the media content item associated with the satisfied condition from the media-delivery system 104 upon user's selection. For example, when the user is notified or becomes aware that the media content item has been accessible, and the user chooses to play it back on the media-playback device 102, the media-playback device 102 operates to retrieve the media content item from the media-delivery system 104. Where the media-playback device 102 locally stores the media content item, the media-playback device 102 can retrieve it without interacting with the media-delivery system 104.

At the operation 424, the media-playback device 102 operates to play back the retrieved media content item.

At the operation 430, the media-delivery system 104 maintains media content items, as described above.

At the operation 432, the media-delivery system 104 operates to transmit the rule data 244 in response to a request from the media-playback device 102.

At the operation 434, the media-delivery system 104 operates to transmit the media content item associated with the satisfied condition upon a request from the media-playback device 102.

Figure 9:
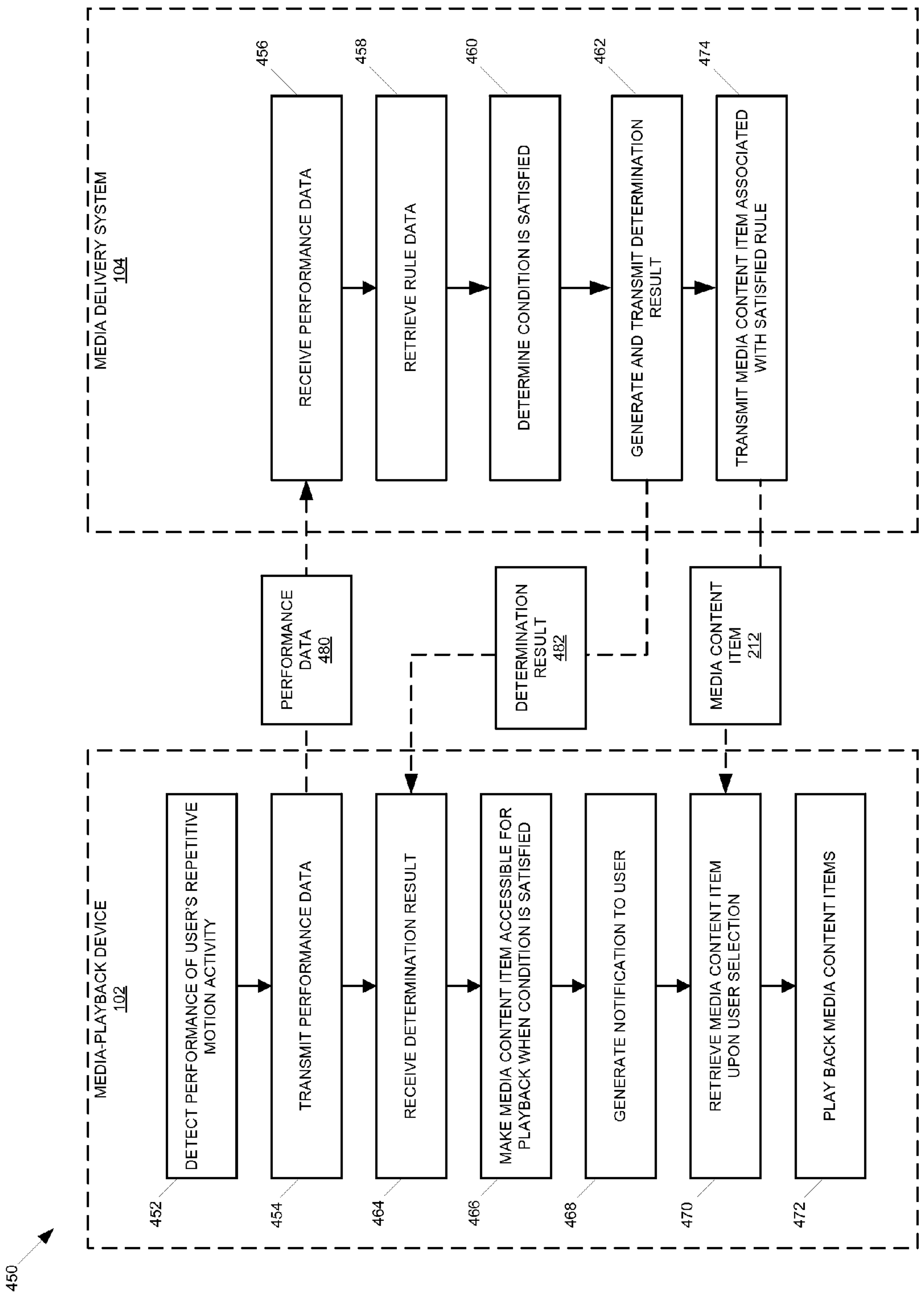
FIG. 9 illustrates a flowchart illustrating another example method of performing an operation of FIG. 3 with the media-playback device and the media-delivery system.

FIG. 9 illustrates a flowchart illustrating another example method 450 of performing the operation 304 of FIG. 3 with the media-playback device 102 and the media-delivery system 104. On the side of the media-playback device 102, the method 450 can include operations 452, 454, 464, 466, 468, 470, and 472. On the side of the media-delivery system 104, the method 410 can include operations 456, 458, 460, 462, and 474.

The method 450 is performed similarly to the method 410 except that an operation of determining whether the user's performance status satisfies conditions for any media content items. Thus, the description for the method 410 with reference to FIG. 8 is incorporated by reference for the method 450.

At the operation 452, the media-playback device 102 operates to detect a performance status of a user's repetitive motion activity. In some embodiments, the media-playback device 102 can automatically detect the performance status in real time while the user is performing the repetitive motion activity.

At the operation 454, the media-playback device 102 operates to transmit performance data 480 to the media-delivery system 104. The performance data 480 include the detected performance status of the user's repetitive motion activity, such as cadence, speed, distance, duration, heart rate, location, over-performance, and/or any other performance data, as described herein.

At the operation 456, the media-delivery system 104 receives the performance data 480.

At the operation 458, the media-delivery system 104 operates to retrieve the rule data 244.

At the operation 460, the media-delivery system 104 operates to determine whether the user's performance satisfies a condition for allowing a media content item to be accessible for playback.

At the operation 462, the media-delivery system 104 operates to generate determination result data 482 and transmit the data 482 to the media-playback device 102.

At the operation 464, the media-playback device 102 operates to receive the determination result data 482.

At the operation 466, the media-playback device 102 operates to make the associated media content item accessible for playback. In some embodiments, the media-playback device 102 updates a user profile to allow the user access to the media content item.

At the operation 468, the media-playback device 102 operates to generate a notification to the user to inform that the condition has been met and the media content item associated with the condition is permitted to be played.

At the operation 470, the media-playback device 102 operates to retrieve the media content item associated with the satisfied condition from the media-delivery system 104 upon user's selection. For example, when the user is notified or becomes aware that the media content item has been accessible, and the user chooses to play it back on the media-playback device 102, the media-playback device 102 operates to retrieve the media content item from the media-delivery system 104. Where the media-playback device 102 locally stores the media content item, the media-playback device 102 can retrieve it without interacting with the media-delivery system 104.

At the operation 472, the media-playback device 102 operates to play back the retrieved media content item.

At the operation 474, the media-delivery system 104 operates to transmit the media content item associated with the satisfied condition upon a request from the media-playback device 102.

Figure 10:
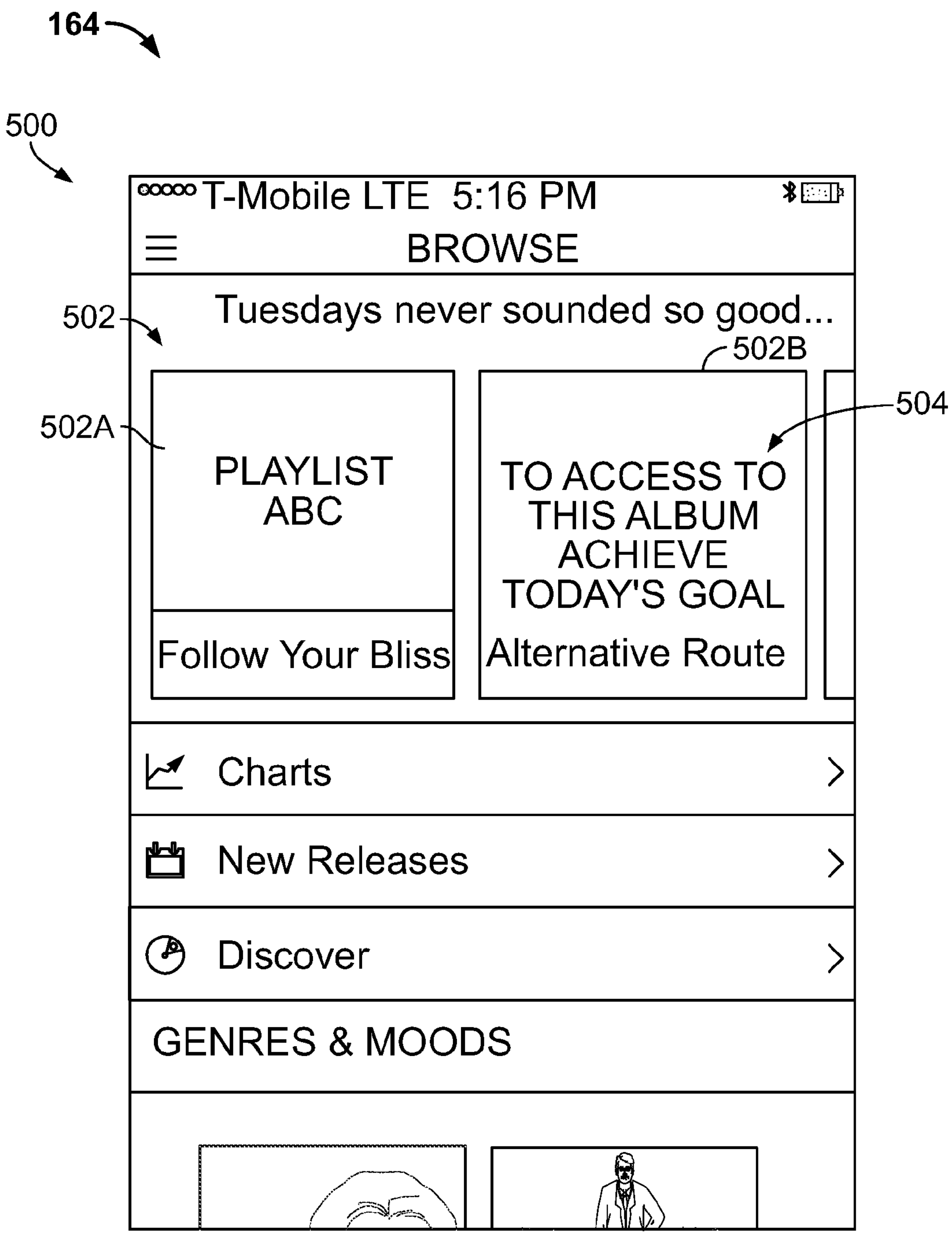
FIG. 10 illustrates an example user interface configured to display a playlist browse page.
Figure 11:
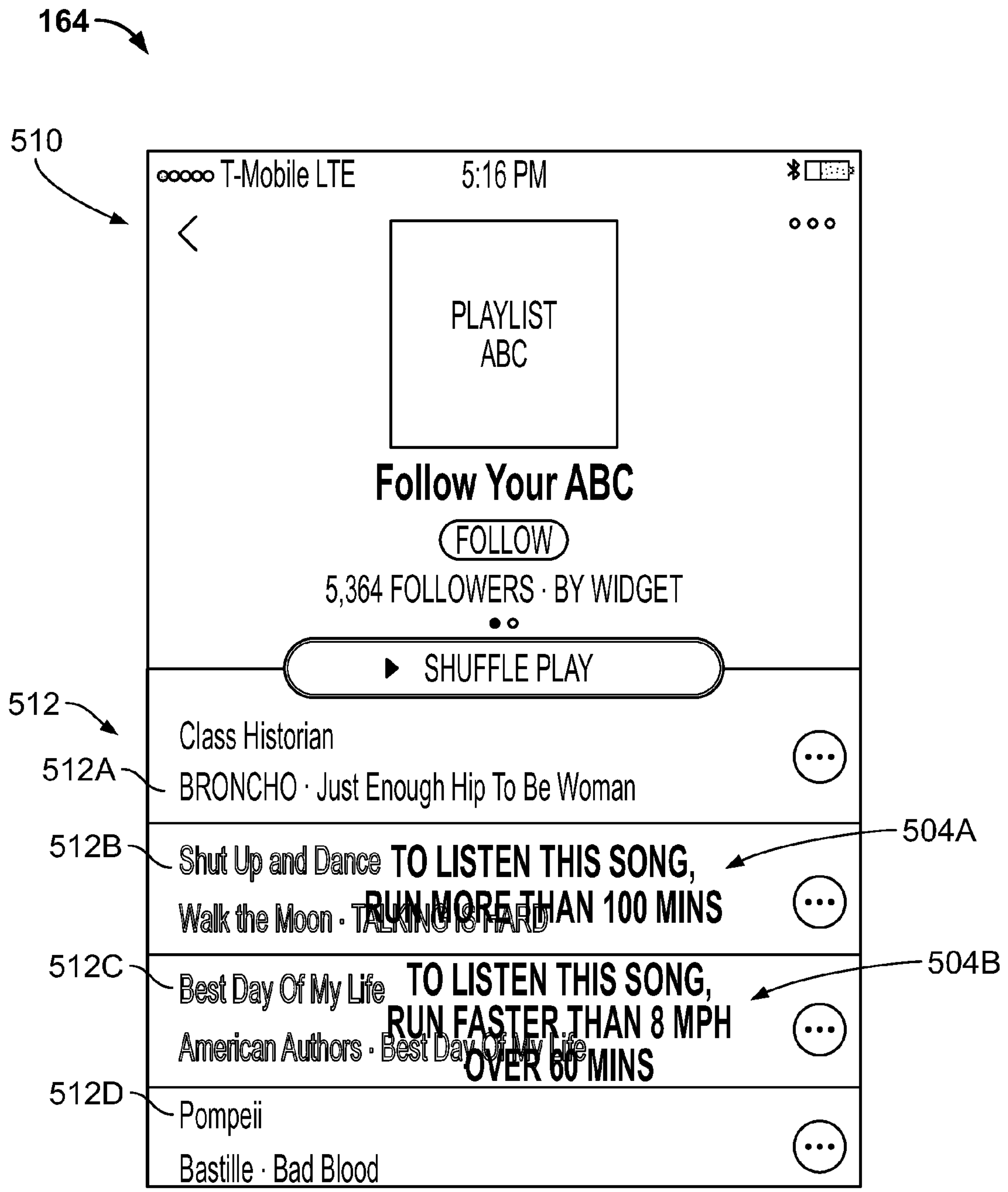
FIG. 11 illustrates an example user interface configured to display a playlist page.

Referring to FIGS. 10 and 11, an example user interface 164 to display media content items or a playlist identifying such media content items.

FIG. 10 illustrates an example user interface 164 configured to display a playlist browse page 500. In some embodiments, the playlist browse page 500 graphically displays one or more playlists 502 (including 502A and 502B). In some embodiments, the playlists include music albums. In other embodiments, the playlists include user-defined playlists or playlists automatically generated by the media-playback device 102 and/or the media-delivery system 104.

In some embodiments, the playlist browse page 500 displays inaccessible playlists differently from accessible playlists. In particular, inaccessible playlists are displayed in a first manner and accessible playlists are displayed in a second manner different from the first manner. For example, a first playlist 502A is accessible and displayed with an image (e.g., album cover) associated with the first playlist 502A. In contrast, a second playlist 502B is not currently accessible and deactivated. In some embodiments, a message 504 is accompanied with the second playlist 502B. For example, the message 504 is placed on or adjacent the second playlist 502B to inform the user of a condition for unlocking the second playlist 502B. Once the condition is met, the second playlist 502B becomes accessible for playback and is displayed in the same manner as the first playlist 502A.

FIG. 11 illustrates an example user interface 164 configured to display a playlist page 510. In some embodiments, the playlist page 510 displays a list of tracks 512 (including 512A-512D). In some embodiments, the tracks identify songs. In other embodiments, the tracks identify media content items of other types.

In some embodiments, the playlist page 510 displays inaccessible tracks differently from accessible tracks. In particular, inaccessible tracks are displayed in a first manner and accessible tracks are displayed in a second manner different from the first manner. For example, first and fourth tracks 512A and 512D are accessible and displayed with information (e.g., title and artist) about the tracks 512A and 512B. In contrast, second and third tracks 512B and 512C are not currently accessible and deactivated. In some embodiments, messages 514A and 514B are accompanied with the second and third tracks 512B and 512C. For example, the playlist message 514A and 514B are placed on or adjacent the second and third tracks 512B and 512C, respectively, to inform the user of conditions for access to the second and third tracks 512B and 512C. Once the conditions are met, the second and third tracks 512B and 512C become accessible for playback and are displayed in the same manner as the first and fourth tracks 512A and 512D.

As noted previously, although many of the examples provided above are described with respect to running, other embodiments relate to other repetitive motion activities as well such as cycling, swimming, and rowing.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. It is to be understood that a numerical range is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A method of managing accessibility of media content items based on a user's performance of a repetitive motion activity, the method comprising:

acquiring, using at least one computing device, a user's performance of a repetitive motion activity;

obtaining, using the at least one computing device, rule data, the rule data containing an accessibility condition associated with a media content item, the media content item being inaccessible for a user to select and play back on the at least one computing device before the accessibility condition is satisfied by the user's performance of the repetitive motion activity;

determining, using the at least one computing device, that the user's performance of the repetitive motion activity satisfies the accessibility condition; and when the user's performance of the repetitive motion activity satisfies the accessibility condition, permitting, using the at least one computing device, the user to select the media content item to play back on the at least one computing device.

2. The method of claim 1, further comprising:

retrieving, using the at least one computing device, the media content item upon user's selection; and playing back the media content item on the at least one computing device.

3. The method of claim 1, wherein obtaining rule data comprises:

obtaining a rule from a rule provider; and generating the rule data containing the rule.

4. The method of claim 3, further comprising:

prompting the rule provider to input the rule through a rule management interface.

5. The method of claim 4, wherein the rule management interface is configured to enable the rule provider to manage the rule data.

6. The method of claim 1, further comprising:

generating, using the at least one computing device, a notification to the user, the notification adapted to inform the user of accessibility of the media content item.

7. The method of claim 1, wherein the condition includes one or more criteria relating to a repetitive motion activity.

8. The method of claim 7, wherein the criteria include at least one of the user's cadence, speed, distance, duration, heart rate, location, and out-performance.

9. The method of claim 1, further comprising:

displaying, using the at least one computing device, information about the media content item in a first manner when the media content item is inaccessible; and displaying, using the at least one computing device, information about the media content item in a second manner different from the first manner when the media content item becomes accessible.

10. The method of claim 9, further comprising:

displaying, using the at least one computing device, a message is accompanied with the media content item when the media content item is inaccessible.

11. A computer-readable storage medium comprising software instructions that, when executed, cause at least one computing device to:

acquire a user's performance of a repetitive motion activity;

obtain rule data, the rule data containing an accessibility condition associated with a media content item, the media content item being inaccessible for a user to select and play back on the at least one computing device before the accessibility condition is satisfied by the user's performance of the repetitive motion activity;

determine that the user's performance of the repetitive motion activity satisfies the accessibility condition; and when the user's performance of the repetitive motion activity satisfies the accessibility condition, permit the user to select the media content item to play back on the at least one computing device.

12. The computer-readable storage medium of claim 11, wherein the software instructions cause the at least one computing device to:

retrieve the media content item upon user's selection; and play back the media content item on the at least one computing device.

13. The computer-readable storage medium of claim 11, wherein the software instructions cause the at least one computing device to:

obtain a rule from a rule provider; and generate the rule data containing the rule.

14. The computer-readable storage medium of claim 13, wherein the software instructions cause the at least one computing device to:

prompt the rule provider to input the rule through a rule management interface.

15. The computer-readable storage medium of claim 14, wherein the rule management interface is configured to enable the rule provider to manage the rule data.

16. The computer-readable storage medium of claim 11, wherein the software instructions cause the at least one computing device to:

generate a notification to the user, the notification adapted to inform the user of accessibility of the media content item.

17. The computer-readable storage medium of claim 11, wherein the condition includes one or more criteria relating to a repetitive motion activity.

18. The computer-readable storage medium of claim 17, wherein the criteria include at least one of the user's cadence, speed, distance, duration, heart rate, location, and out-performance.

19. The computer-readable storage medium of claim 11, wherein the software instructions cause the at least one computing device to:

display information about the media content item in a first manner when the media content item is inaccessible; and display information about the media content item in a second manner different from the first manner when the media content item becomes accessible.

20. The computer-readable storage medium of claim 19, wherein the software instructions cause the at least one computing device to:

display a message is accompanied with the media content item when the media content item is inaccessible.

* * * * *

UNITED STATES PATENT AND TRADEMARK OFFICE

CERTIFICATE OF CORRECTION

PATENT NO. : 9,448,763 B1
APPLICATION NO. : 14/883323
DATED : September 20, 2016
INVENTOR(S) : Dziuk et al.

It is certified that error appears in the above-identified patent and that said Letters Patent is hereby corrected as shown below:

Column 18, Line 36, Claim 20: “message is accompanied with the” should read --message accompanied with the--

Signed and Sealed this
Second Day of October, 2018

Andrei Iancu
*Director of the United States Patent and Trademark Office*